US009568690B2

(12) United States Patent
Ista et al.

(10) Patent No.: US 9,568,690 B2
(45) Date of Patent: *Feb. 14, 2017

(54) PLUGGABLE OPTICAL MODULE LATCH MECHANISM AND METHOD

(71) Applicants: Tyler Ista, Pleasanton, CA (US); Gabriel E. Cardona, Richardson, TX (US); Salam Elahmadi, Dallas, TX (US)

(72) Inventors: Tyler Ista, Pleasanton, CA (US); Gabriel E. Cardona, Richardson, TX (US); Salam Elahmadi, Dallas, TX (US)

(73) Assignee: Menara Networks, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/064,743

(22) Filed: Mar. 9, 2016

(65) Prior Publication Data
US 2016/0187596 A1    Jun. 30, 2016

Related U.S. Application Data

(63) Continuation of application No. 14/087,632, filed on Nov. 22, 2013, now Pat. No. 9,316,797.

(51) Int. Cl.
*G02B 6/38* (2006.01)
*G02B 6/42* (2006.01)

(52) U.S. Cl.
CPC ........... *G02B 6/3893* (2013.01); *G02B 6/3807* (2013.01); *G02B 6/4261* (2013.01); *G02B 6/4284* (2013.01)

(58) Field of Classification Search
CPC ....... G02B 6/3807; G02B 6/387; G02B 6/389; G02B 6/3893; G02B 6/4261
See application file for complete search history.

(56) References Cited

U.S. PATENT DOCUMENTS

RE36,886 E     10/2000  Ishibashi et al.
6,439,918 B1    8/2002  Togami et al.
(Continued)

FOREIGN PATENT DOCUMENTS

CN      102141658 B    4/2013
CN      101552407 B    6/2013
WO     2008067489 A2   6/2008

OTHER PUBLICATIONS

SFF Committee, SFF-8431 Specifications for Enhanced Small Form Factor Pluggable Module SFP+, Revision 4.1, Jul. 6, 2009.

*Primary Examiner* — Daniel Petkovsek
(74) *Attorney, Agent, or Firm* — Clements Bernard PLLC; Lawrence A. Baratta, Jr.; Christopher L. Bernard

(57) ABSTRACT

A latch mechanism for a pluggable optical module includes a slide disposed in the pluggable optical module, wherein the slide includes a front cylinder connected to a rear cylinder with a slide body therebetween and a post connected to the rear cylinder; a bail over a top of a front portion of the pluggable optical module and rotatably connected thereto, wherein the bail includes a first cutout portion on each side in which the front cylinder is moveably positioned therein; a ramp disposed within the pluggable optical module for sliding the rear cylinder thereon; and a notch disposed within the pluggable optical module for translating force from the post thereto responsive to the bail moving the front cylinder, the front cylinder applying force to the rear cylinder via the slide body, and the rear cylinder translating the force to the post.

12 Claims, 14 Drawing Sheets

(56) References Cited

U.S. PATENT DOCUMENTS

| | | | |
|---|---|---|---|
| 6,811,317 B2 | 11/2004 | Chiu et al. | |
| 6,824,416 B2 | 11/2004 | Di Mascio | |
| 6,846,114 B2 | 1/2005 | Chiu et al. | |
| 6,851,867 B2 | 2/2005 | Pang | |
| 6,884,097 B2 | 4/2005 | Ice | |
| 6,908,323 B2 | 6/2005 | Ice | |
| 7,066,746 B1 | 6/2006 | Togami et al. | |
| 7,083,336 B2 | 8/2006 | Kim et al. | |
| 7,088,518 B2 | 8/2006 | Tatum et al. | |
| 7,090,523 B2 | 8/2006 | Shirk et al. | |
| 7,114,984 B2 | 10/2006 | Shirk et al. | |
| 7,186,134 B2 | 3/2007 | Togami et al. | |
| 7,255,484 B2 | 8/2007 | Walker, Jr. et al. | |
| 7,264,406 B1 * | 9/2007 | Yoshikawa | G02B 6/4201 385/88 |
| RE40,150 E | 3/2008 | Ishibashi et al. | |
| RE40,154 E | 3/2008 | Ishibashi et al. | |
| 7,351,090 B1 | 4/2008 | Moore | |
| 7,484,987 B2 | 2/2009 | Ice | |
| 7,507,111 B2 | 3/2009 | Togami et al. | |
| 7,537,476 B1 | 5/2009 | McColloch | |
| 7,547,149 B2 | 6/2009 | Ice | |
| 7,643,720 B2 | 1/2010 | Kim et al. | |
| 7,690,939 B2 | 4/2010 | Wu | |
| 7,780,465 B2 | 8/2010 | Priyadarshi et al. | |
| 7,955,003 B2 | 6/2011 | Teo et al. | |
| 8,019,226 B2 | 9/2011 | McColloch | |
| 8,075,199 B2 | 12/2011 | Losio et al. | |
| 9,122,030 B2 | 9/2015 | Xie | |
| 9,316,797 B2 * | 4/2016 | Ista | G02B 6/3893 |
| 2006/0078259 A1 | 4/2006 | Fuchs | |
| 2011/0080008 A1 | 4/2011 | Teo et al. | |
| 2011/0267742 A1 | 11/2011 | Togami et al. | |
| 2012/0063100 A1 | 3/2012 | Su et al. | |
| 2012/0257865 A1 | 10/2012 | Lavoie et al. | |
| 2012/0275120 A1 | 11/2012 | Nguyen | |
| 2013/0071072 A1 | 3/2013 | Xie | |
| 2013/0178090 A1 | 7/2013 | Teo et al. | |

\* cited by examiner

PLUGGABLE OPTICAL MODULE LATCH MECHANISM AND METHOD

CROSS-REFERENCE TO RELATED APPLICATION(S)

The present application/patent is a continuation of co-pending U.S. patent application Ser. No. 14/087,632 filed Nov. 22, 2013 (which is now U.S. Pat. No. 9,316,797), and entitled "PLUGGABLE OPTICAL MODULE LATCH MECHANISM AND METHOD," the contents of which are incorporated by reference.

FIELD OF THE DISCLOSURE

The present disclosure relates generally to networking hardware systems and methods. More particularly, the present disclosure relates to a pluggable optical module latch mechanism such as for Small Form Factor Pluggable (SFP), enhanced Small Form Factor Pluggable (SFP+), 10 Gigabit Small Form Factor Pluggable (XFP), etc.

BACKGROUND OF THE DISCLOSURE

Pluggable transceivers are defined through multi-source agreements (MSAs). MSAs are agreements for specifications of pluggable transceivers agreed to by two or more vendors and promulgated for other vendors and network operators to utilize. MSAs allow other vendors to design transceivers to the same specifications reducing risk for vendors and operators, increasing flexibility, and accelerating the introduction of new technology. Exemplary MSAs include XFP, XPAK, XENPAK, X2, XFP-E, SFP, and SFP+. Additionally, new MSAs are emerging to address new services and advanced technology. Each MSA defines the transceiver's mechanical characteristics, management interfaces, electrical characteristics, optical characteristics, and thermal requirements. Because of MSA specifications, MSA-compliant pluggable transceivers are standardized among equipment vendors and network operators to support multiple sources for pluggable transceivers and interoperability. As such, MSA-compliant pluggable transceivers have become the dominant form of optical transmitters and receivers in the industry.

Advantageously, MSA-compliant pluggable transceivers ensure engineering re-use and compatibility between various applications and the physical media dependent transceivers. Further, equipment vendors realize streamlined manufacturing and inventory control by removing wavelength specific decisions from the manufacturing process. For example, all line cards are manufactured the same, and the pluggable transceiver module with the desired wavelength (e.g. 850 nm, 1310 nm, 1550 nm, coarse wave division multiplexed (CWDM), dense wave division multiplexed (DWDM), etc.) is plugged in as a function of the specific application or development configuration. Network operators and service providers have adopted pluggable transceivers to reduce sparing costs. Further, significant cost reductions are realized by MSA standardization of pluggable transceivers because of multiple independent manufacturing sources.

Various MSA specifications exist such as for SFP, SFP+, and XFP. Relevant interface standards include SFF-8431—SFP+, SFF-8432—Improved Pluggable Form factor, SFF-8083—Improved 0.8 mm Card Edge Connector, SFF-8089—SFP Rate and Application codes, SFF-8079—SFP Rate and Application Selection, INF-8074i—SFP (Small Form Factor) Transceiver, and INF-8077i—10 Gigabit Small Form Factor Pluggable Module (XFP MSA), each of which is available online at ftp.seagate.com/sff/ and the contents of each is incorporated by reference herein.

With these MSAs and with future defined MSAs, physical size is small as networking equipment becomes increasingly dense with increased capacity. As such, physical manipulation of pluggable transceivers is a difficult problem in terms of inserting, removing, and latching the pluggable transceivers in host devices or equipment.

BRIEF SUMMARY OF THE DISCLOSURE

In an exemplary embodiment, a latch mechanism for a pluggable optical module includes a slide disposed in the pluggable optical module, wherein the slide includes a front cylinder connected to a rear cylinder with a slide body therebetween and a post connected to the rear cylinder; a bail over a top of a front portion of the pluggable optical module and rotatably connected thereto, wherein the bail includes a first cutout portion on each side in which the front cylinder is movably positioned therein; a ramp disposed within the pluggable optical module for sliding the rear cylinder thereon; and a notch disposed within the pluggable optical module for translating force from the post thereto responsive to the bail moving the front cylinder, the front cylinder applying force to the rear cylinder via the slide body, and the rear cylinder translating the force to the post. The latch mechanism can further include a second cutout portion on each side of the bail for snapping the bail in a latched position via a dimple disposed on each side of the pluggable optical module. A curvature of the first cutout portion can define movement of the bail. The bail can include a top side, a left side, and a right side, and the movement of the bail enables the bail to move over connectors connected to the optical connectors. The latch mechanism can further include a lip portion disposed to the front portion, wherein the lip portion houses the slide enabling rotation of the front cylinder and the rear cylinder and sliding of the slide body. The pluggable optical module can include a Small Form Factor Pluggable (SFP), an enhanced Small Form Factor Pluggable (SFP+), or a 10 Gigabit Small Form Factor Pluggable (XFP).

In another exemplary embodiment, a pluggable optical module includes a body portion including a rear portion configured to engage a host; a front portion including optical connectors; a slide disposed in the front portion, wherein the slide includes a front cylinder connected to a rear cylinder with a slide body therebetween and a post connected to the rear cylinder; a bail over a top of the front portion and rotatably connected thereto, wherein the bail includes a first cutout portion on each side in which the front cylinder is movably positioned therein; a ramp disposed within the front portion for sliding the rear cylinder thereon; and a notch disposed within the front portion for translating force from the post thereto responsive to the bail moving the front cylinder, the front cylinder applying force to the rear cylinder via the slide body, and the rear cylinder translating the force to the post. The pluggable optical module can further include a second cutout portion on each side of the bail for snapping the bail in a latched position via a dimple disposed on each side of the front portion. A curvature of the first cutout portion can define movement of the bail. The bail can include a top side, a left side, and a right side, and wherein the movement of the bail enables the bail to move over connectors connected to the optical connectors. The pluggable optical module can further include a lip portion disposed to the front portion, wherein the lip portion houses the slide enabling rotation of the front cylinder and the rear cylinder and sliding of the slide body. The pluggable optical module can include a Small Form Factor Pluggable (SFP), an enhanced Small Form Factor Pluggable (SFP+), or a 10 Gigabit Small Form Factor Pluggable (XFP).

In yet another exemplary embodiment, a method includes pulling in a downward motion a bail on a pluggable optical module inserted in a host device; engaging a first cylinder on a slide in the pluggable optical module with first cutouts on the bail during the pulling; disengaging dimples on the pluggable optical module from second cutouts on the bail; translating a rotational force from the first cylinder to a second cylinder connected to the first cylinder via a slide body; and applying a force from the second cylinder to a post on the slide to disengage the pluggable optical module from the host device. The pluggable optical module can include a Small Form Factor Pluggable (SFP), an enhanced Small Form Factor Pluggable (SFP+), or a 10 Gigabit Small Form Factor Pluggable (XFP).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, the present disclosure relates to a pluggable optical module latch mechanism such as for Small Form Factor Pluggable (SFP), enhanced Small Form Factor Pluggable (SFP+), 10 Gigabit Small Form Factor Pluggable (XFP), etc. A latch mechanism for a pluggable optical module includes a slide disposed in the pluggable optical module, wherein the slide includes a front cylinder connected to a rear cylinder with a slide body therebetween and a post connected to the rear cylinder; a bail over a top of a front portion of the pluggable optical module and rotatably connected thereto, wherein the bail includes a first cutout portion on each side in which the front cylinder is movably positioned therein; a ramp disposed within the pluggable optical module for sliding the rear cylinder thereon; and a notch disposed within the pluggable optical module for translating force from the post thereto responsive to the bail moving the front cylinder, the front cylinder applying force to the rear cylinder via the slide body, and the rear cylinder translating the force to the post.

Figure 1:
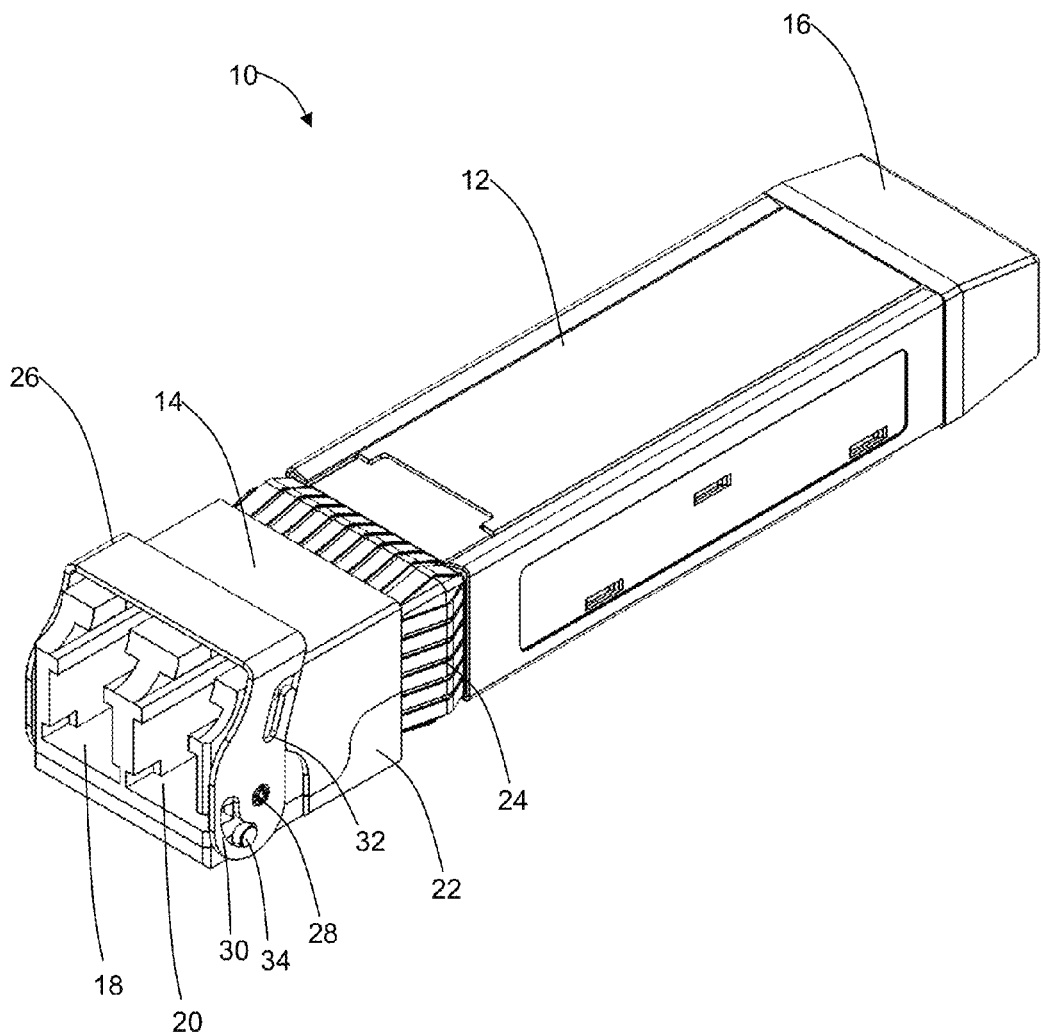
FIG. 1 is a perspective diagram of a pluggable optical module in an exemplary embodiment.

Referring to FIG. 1, in an exemplary embodiment, a perspective diagram illustrates a pluggable optical module 10. The optical module 10 can conform to the SFP or SFP+ specifications although other specifications are also contemplated. The optical module 10 is operable for selective insertion and removal from a host system (not shown) which is configured to operate according to the same specifications as the optical module 10. The optical module 10 is a compact pluggable transceiver used in optical communications for both telecommunication and data communications applications. It interfaces a network device or components therein (e.g., a switch, router, cross-connect, add/drop multiplexer or similar device) to a fiber optic or unshielded twisted pair networking cable. For example, SFP is a popular industry format supported by several fiber optic component vendors. SFP transceivers are designed to support SONET, Gigabit Ethernet, Fibre Channel, and other communications standards. SFP+ is a specification for a pluggable, hot-swappable optical interface for SONET/SDH, Fiber Channel, Gigabit Ethernet, and other applications. SFP+ is designed for up to 80 km reach and supports a full range of applications. SFP+ is similar in size and power with the XFP specification and similarly accepts a serial electrical input.

The optical module 10 includes a body portion 12 and a front portion 14. Generally, the optical module 10 is inserted into the host system by placing the body portion 12 in a corresponding cage (not shown) in the host system with a rear portion 16 including physical connections therebetween. The front portion 14 includes connection housings 18, 20 for selectively receiving cabling therein such as optical fiber cables with appropriate connectors (not shown). The optical module 10 further includes a lid portion 22 which can be part of the front portion 14 or disposed thereto. The optical module 10 also includes EMI fingers 24 between the front portion 14 and the body portion 12.

The optical module 10 includes a novel latching mechanism for selectively securing and removing the optical module 10 from the host device. The novel latch mechanism includes a bail 26 which is rotatably disposed on the front portion 14. The bail 26 is operable to latch and unlatch the optical module 10 in the host device. Specifically, the bail 26 can be rotatably attached to the front portion 14 via a connection 28 such as a rotatable screw or the like. The bail 26 includes two cutout portions 30, 32 on each side. The first cutout 30 interfaces a cylinder 34 that is part of a slide which is described in more detail herein in FIGS. 3-8. The cutout 30 has a curved shaped and the cylinder 34 moves in the cutout portion 30 from a latched position (shown in FIG. 1) to an unlatched position at an opposite side of the cutout portion 30 to translate force from the bail 26 rotation to the slide as is described herein. The second cutout portion 32 interfaces a dimple (shown in more detail herein) that is connected to the front portion 14 to create a snap feature that holds the bail 26 in a vertical position when latched.

Movement of the bail 26 is defined by the cutout portion 30 and the curvature associated therewith. In operation, the bail 26 can move along the cutout portion 30 based on engagement with the cylinder 34 and rotation about the connection 28. Once the cylinder 34 reaches an end of the cutout portion 30, the bail 26 no longer rotates but translates any forces towards back portions of the slide (again, illustrated in FIGS. 3-8) for unlatching of the optical module 10 from the host device. Thus, the cutout portion 30 defines the movement of the bail 26, and the cutout portion 32 is used to maintain or snap the bail 26 in place in a latched position.

Figure 2:
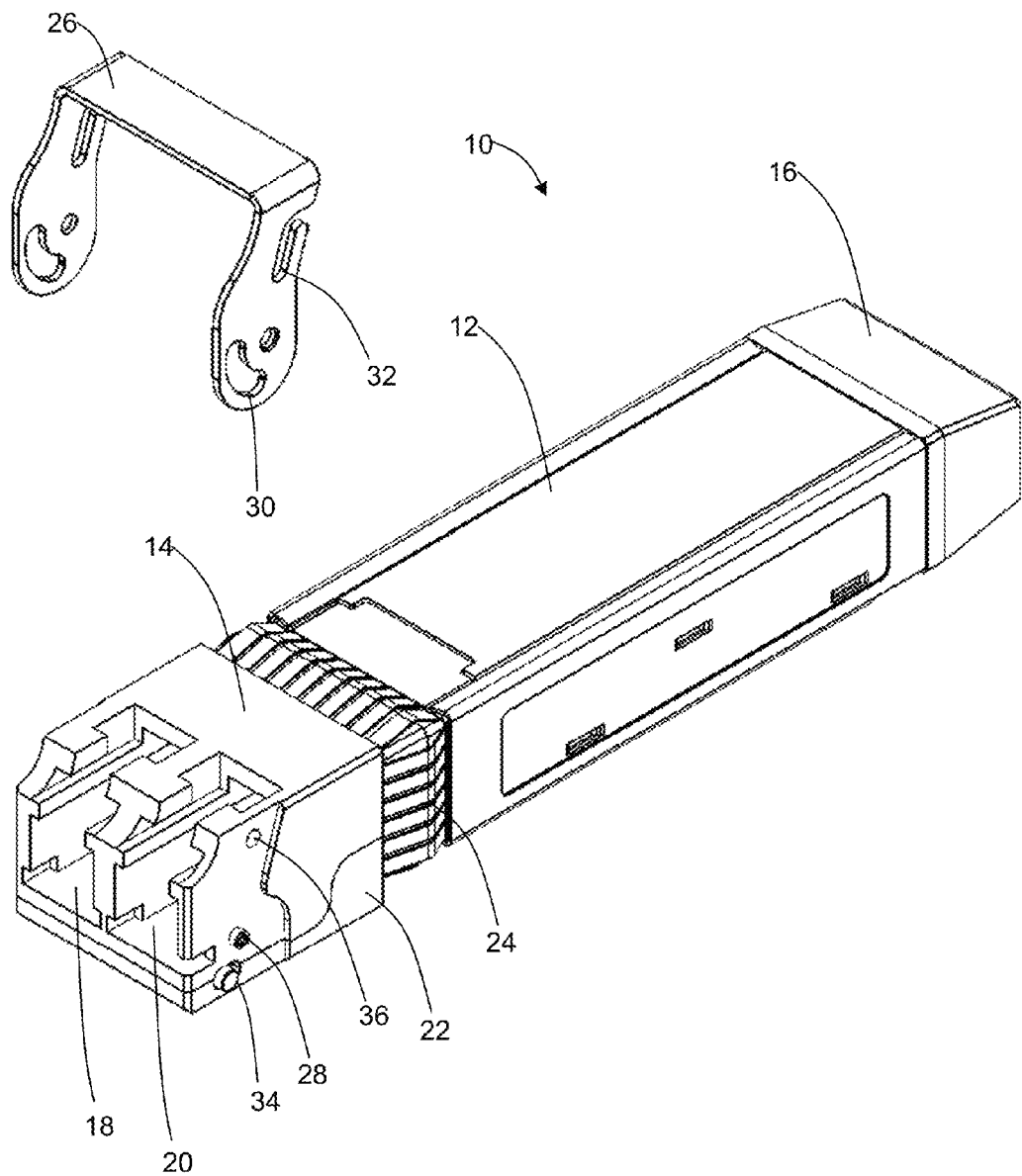
FIG. 2 is a perspective diagram of the pluggable optical module of FIG. 1 with the bail removed from the front portion of the pluggable optical module.

Referring to FIG. 2, in an exemplary embodiment, a perspective diagram illustrates the pluggable optical module 10 with the bail 26 removed from the front portion 14. Specifically, FIG. 2 illustrates the front portion 14 without the bail 26. The cylinder 34 which is part of the slide (illustrated in FIGS. 3-8) is located between the lid portion 22 and the front portion 14. The connection 28 is illustrated on the exposed front portion 14. The front portion 14 includes a fixed dimple 36 that engages the cutout portion 32 in the bail 26 to snap in place in a latched position. As can be seen in FIG. 2, the bail 26 can be removed and added to the front portion 14. Thus, the bail 26 can be added at an end stage of a manufacturing process to a semi-finished module.

Figure 3:
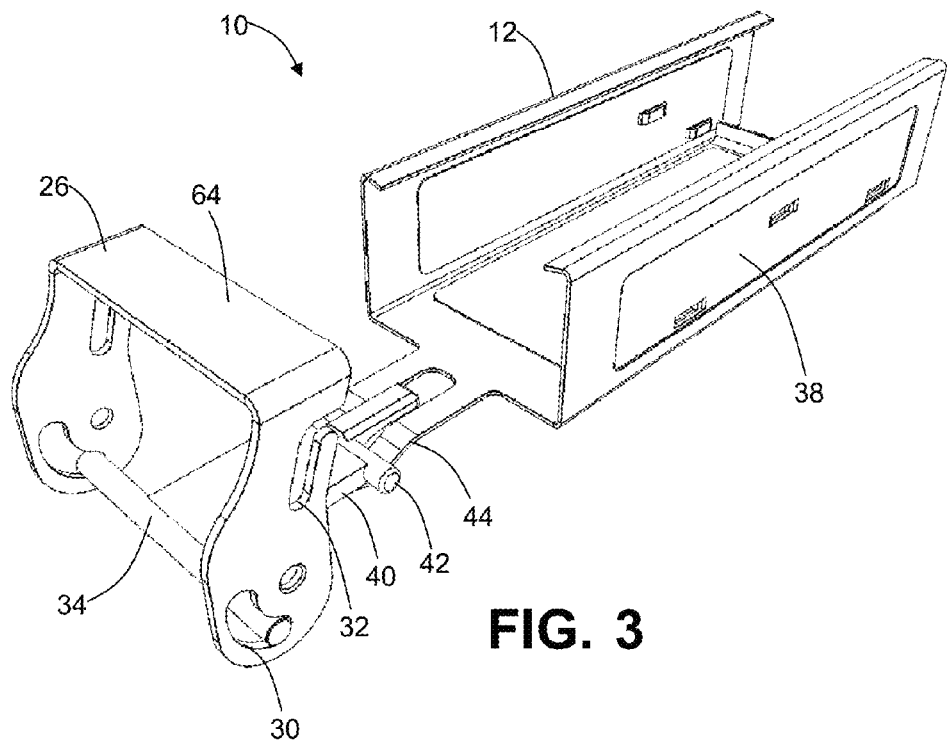
FIG. 3 is a perspective diagram of the optical module of FIG. 1 illustrating the bail coupled to a cylinder of a slide with the front portion and the lid portion of the optical module of omitted for illustration purposes.
Figure 4:
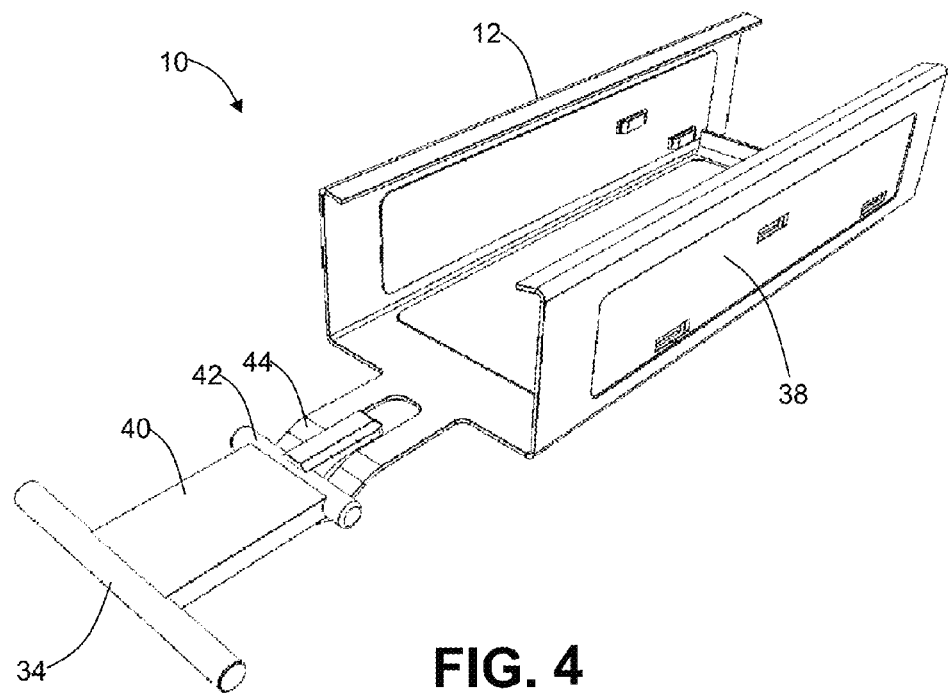
FIG. 4 is a perspective diagram of the optical module of FIG. 1 illustrating the slide of FIG. 3 with a cylinder portion on a ramp associated with a back cover of the body portion with the bail, the front portion, and the lid portion of the optical module omitted for illustration purposes.
Figure 5:
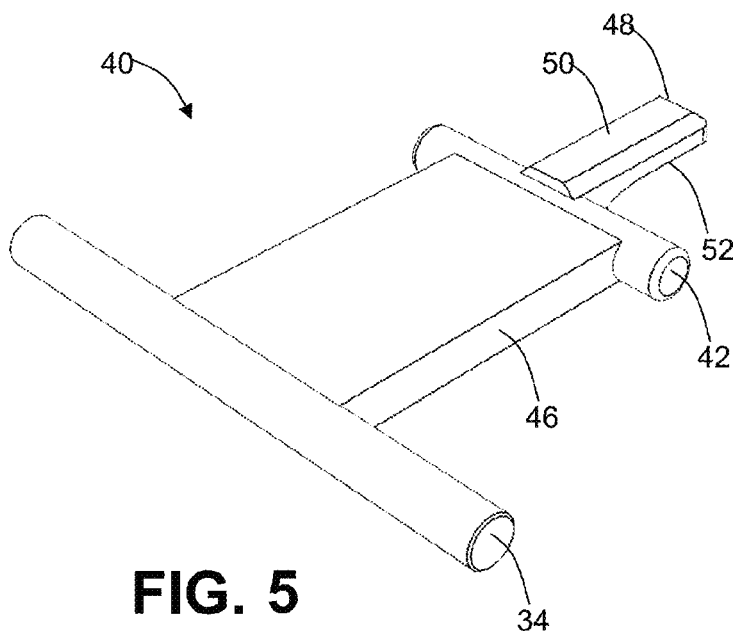
FIG. 5 is a perspective view of the slide of FIGS. 3-4 and components associated therewith.
Figure 6:
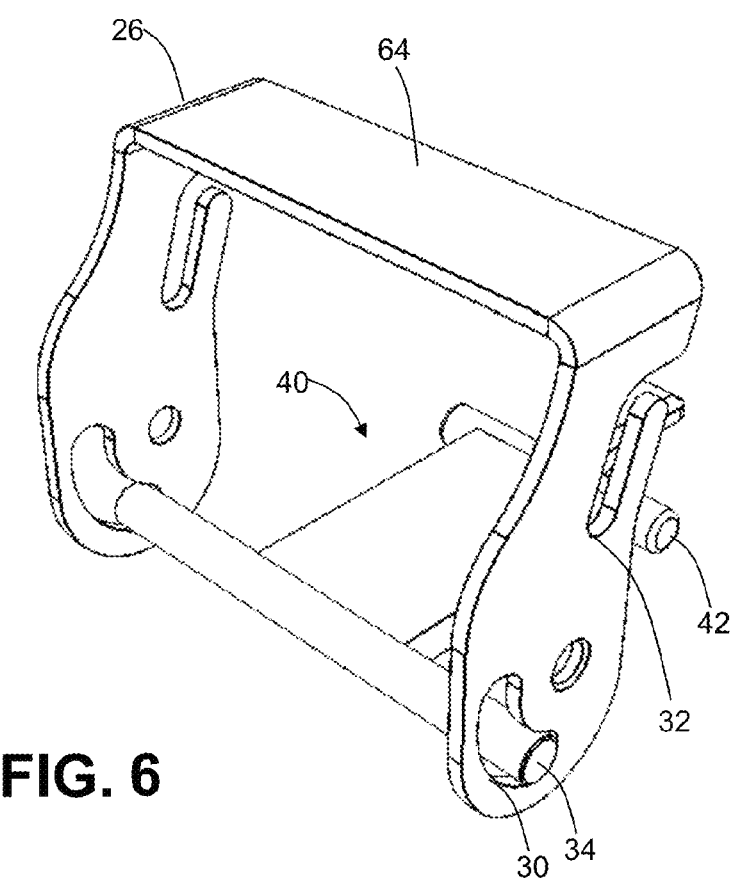
FIG. 6 is a perspective view of the slide of the slide of FIGS. 3-4 interconnected with the bail.
Figure 7:
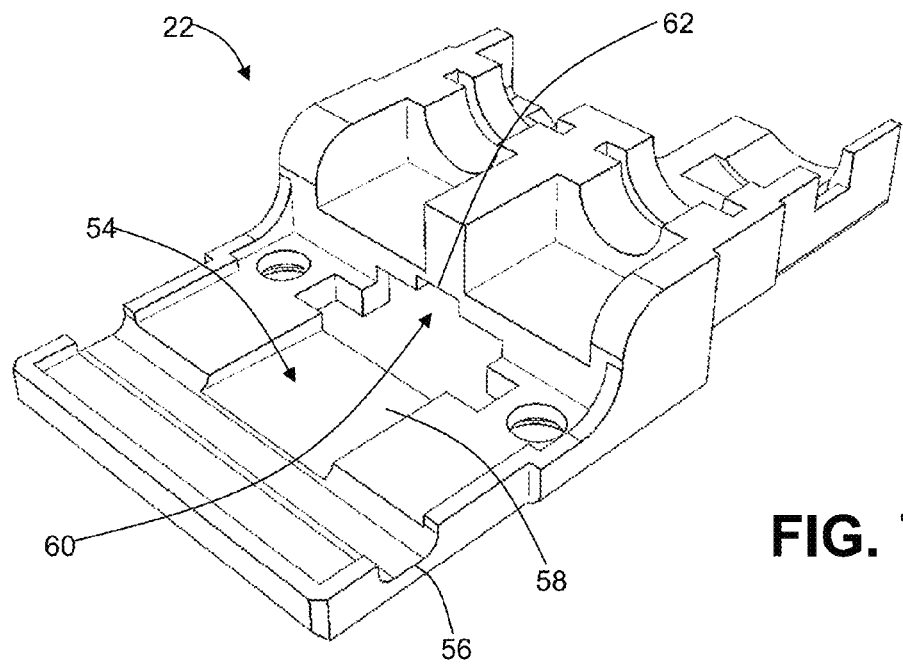
FIG. 7 is a perspective view of the lid portion of the optical module of FIG. 1 with other components omitted for illustration purposes.
Figure 8:
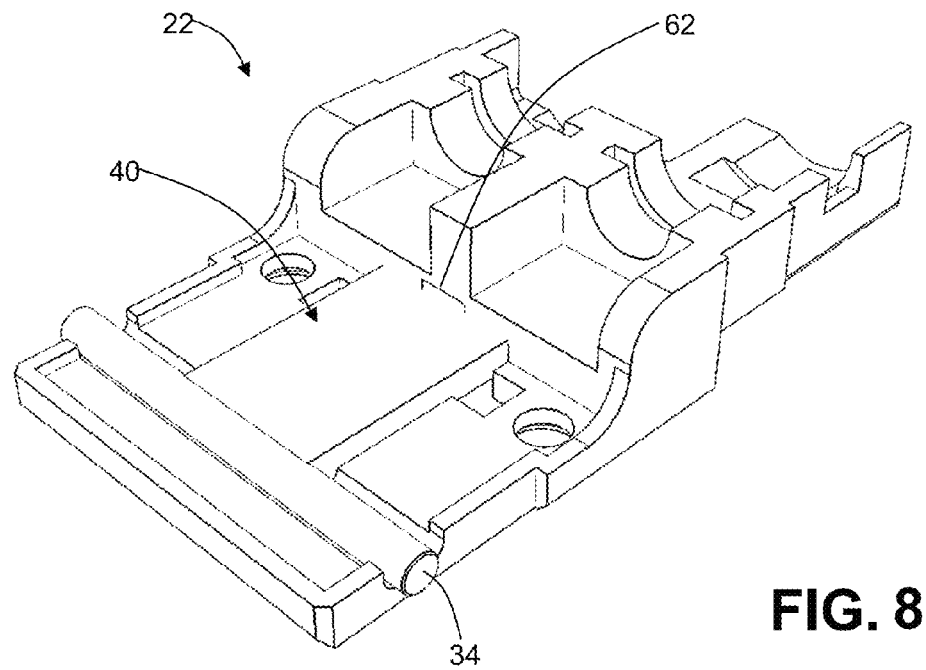
FIG. 8 is a perspective view of the lid portion of FIG. 7 with the slide of FIGS. 3-5 disposed therein with other components omitted for illustration purposes.

Referring to FIGS. 3-8, in an exemplary embodiment, perspective diagrams illustrate portions of the pluggable optical module 10 detailing components of the novel latch mechanism and operation thereof. FIG. 3 is a perspective diagram of the optical module 10 illustrating the bail 26 coupled to the cylinder 34 of a slide 40 with the front portion 14 and the lid portion 22 omitted for illustration purposes. FIG. 4 is a perspective diagram of the optical module 10 illustrating the slide 40 with a cylinder 42 on a leaf spring 44 associated with a back cover 38 of the body portion 12 with the bail 26, the front portion 14, and the lid portion 22 omitted for illustration purposes. FIG. 5 is a perspective view of the slide 40 and components associated therewith. FIG. 6 is a perspective view of the slide 40 interconnected with the bail 26. FIG. 7 is a perspective view of the lid portion 22 with other components omitted for illustration purposes. FIG. 8 is a perspective view of the lid portion 22 with the slide 40 disposed therein with other components omitted for illustration purposes.

The slide 40 includes the cylinder 34 and the cylinder 42 with a body section 46 interconnecting them. The cylinder 42 also is disposed to a lifter 48 which has a substantially flat top side 50 and a curved bottom side 52 as illustrated in FIG. 5. The slide 40 is disposed within a cutout portion 54 of the lid portion 22 as is illustrated in FIGS. 7-8. The cutout portion 54 has a similar opposing shape of the slide 40 with an opening 56 to enable the cylinder 34 to extend out of the lid portion 22 for engagement with the bail 26 through the cutout portion 30. The cutout portion 54 also includes an open portion 58 for housing the body section 46 of the slide 40 as well as enabling the body portion 46 to slide linearly based on movement of the slide 40 due to rotational force applied by the bail 26. The cutout portion 54 further includes a closed portion 60 for housing the cylinder 42 and the lifter 48. The closed portion 60 includes a ramp on which the cylinder 42 moves. Collectively referring to FIGS. 3-8, operationally, the bail 26 is the point of physical interaction by a user to operate the latch mechanism of the optical module 10. Again, the bail 26 is configured to rotate between a latched position where a top side 64 of the bail 26 is substantially horizontal to an unlatched position where the top side 64 is relatively diagonal and rotated out relative to the rear portion 16 of the optical module. Again, the bail 26 is configured securely in the latched position by the cutout portion 32 and the dimple 36.

Moving to the unlatched position, the bail 26 is rotated about the connection 28 and constrained by the cutout portion 30 and the cylinder 34. The amount of rotational movement allowed for the bail 26 is defined by the cutout portion 30 and the cylinder 34 and also the cutout in the lid 56. Once the cylinder 34 reaches an end of the cutout portion 30, a rotational force is applied to the cylinder 34 by the bail 26. This rotational force by the cylinder 34 is translated through the body portion 46 of the slide to the cylinder 42 which rotates to apply force to the lifter 48 as the cylinder 42 moves in the leaf spring 44.

The latch mechanism includes the dual cylinders 34, 42 to apply combined translation to unlatch the optical module 10. That is, the novel latch mechanism includes a novel dual rotational mechanism enabled by the slide 40, the cylinders 34, 42, the bail 26, etc. The first cylinder 34 is for engaging the bail 26 and the second cylinder 42 is for disengaging the optical module 10 based on the force applied to the bail 26 and the first cylinder 34.

Figure 9:
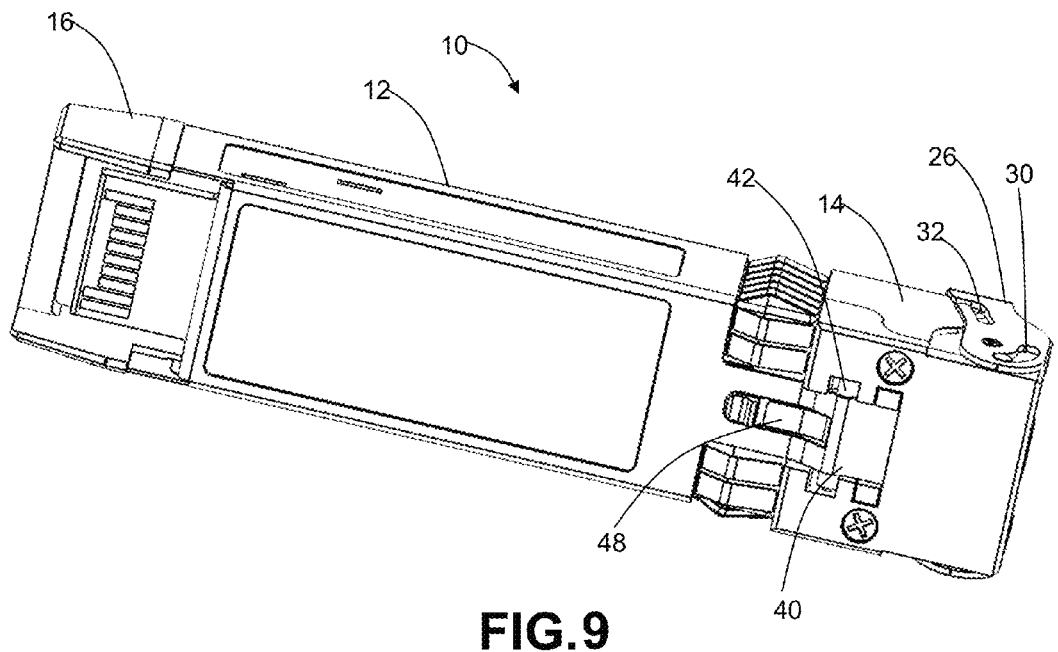
FIG. 9 is a perspective diagram of the bottom of the optical module of FIG. 1.
Figure 10:
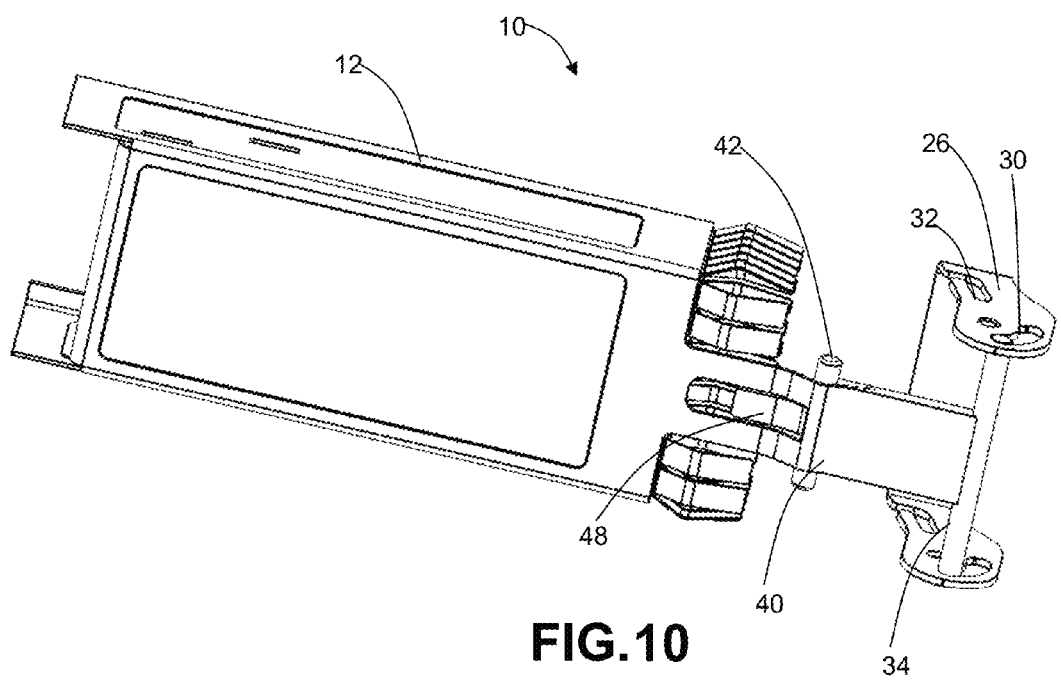
FIG. 10 is a perspective diagram of the bottom of the optical module of FIG. 1 similar to FIG. 9 with components omitted for illustration purposes.
Figure 11:
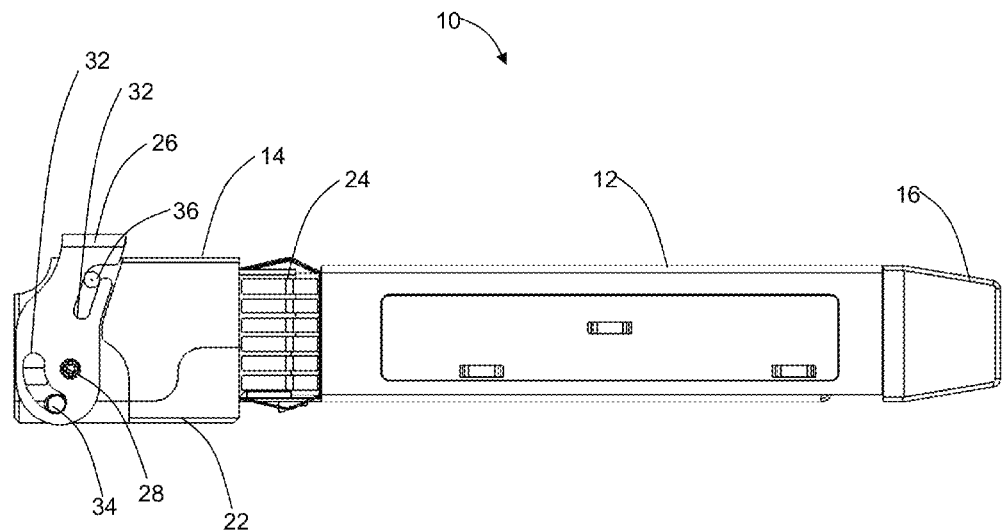
FIG. 11 is a schematic diagram of a left side of the optical module of FIG. 1.
Figure 12:
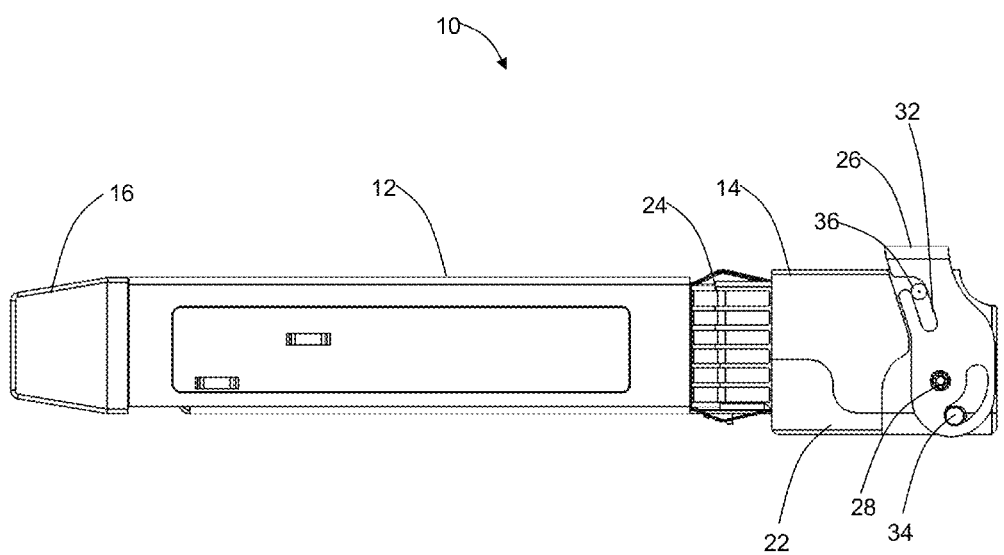
FIG. 12 is a schematic diagram of a right side of the optical module of FIG. 1.
Figure 13:
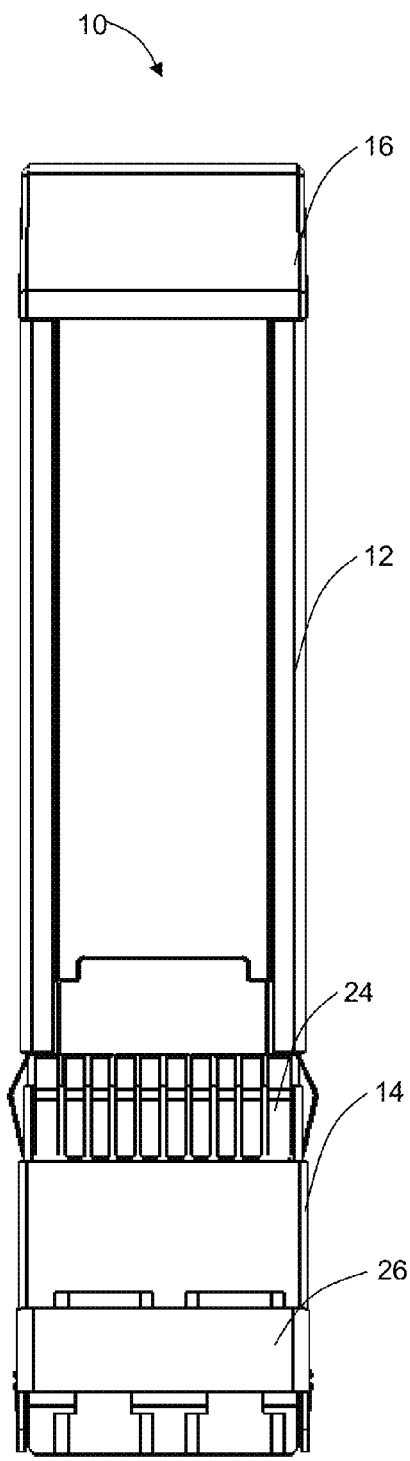
FIG. 13 is a schematic diagram of a top side of the optical module of FIG. 1.
Figure 14:
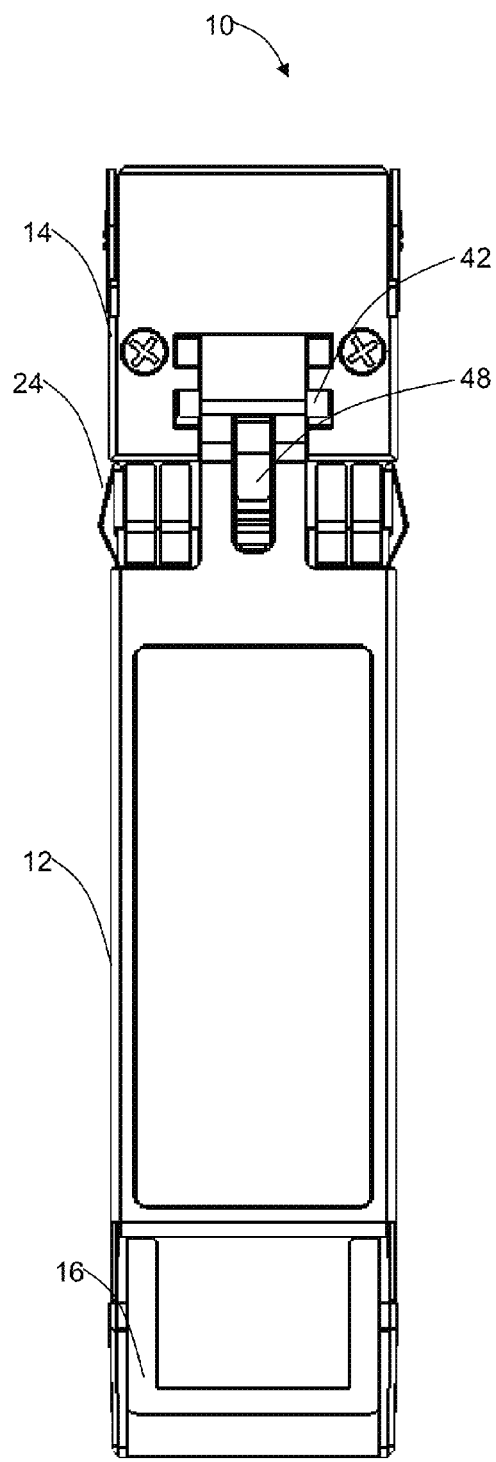
FIG. 14 is a schematic diagram of a bottom side of the optical module of FIG. 1.

Referring to FIGS. 9-10, in an exemplary embodiment, perspective diagrams illustrate the bottom of the optical module 10 with and without the front portion 14 for illustration of the latch mechanism. Here, the lifter 48 is shown relative to the body portion and it can be seen the various forces applied to the bail 26 and through the slide 40 enable the lifter 48 to lift the body portion 16 for disengagement with a host device (not shown).

Referring to FIGS. 11-14, in an exemplary embodiment, various schematic diagrams illustrate a left side (FIG. 11), a right side (FIG. 12), a top side (FIG. 13), and a bottom side (FIG. 14) of the optical module 10. FIGS. 11-14 illustrate the various components and their relationships in the optical module 10.

Figure 15:
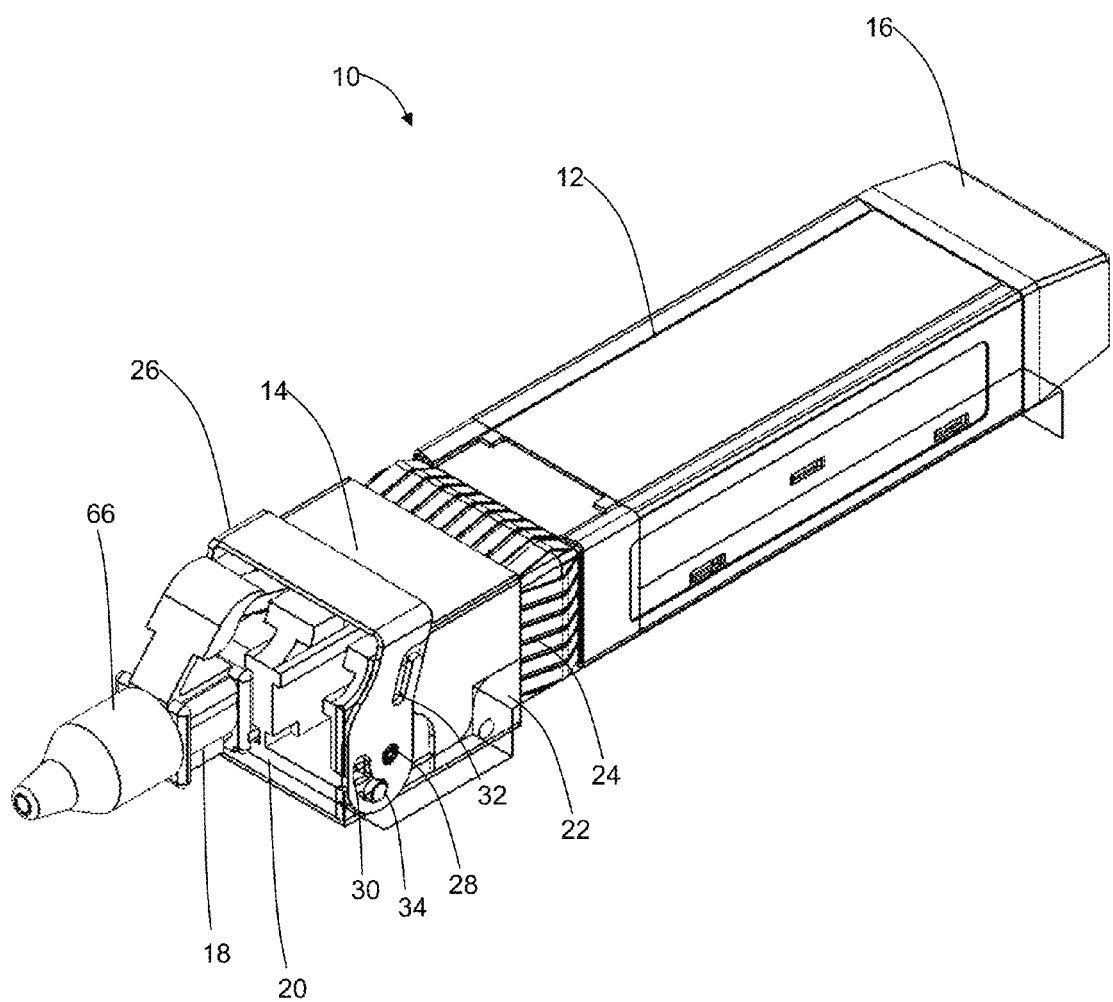
FIG. 15 is a perspective diagram of the optical module of FIG. 1 with an optical connector disposed therein.

Referring to FIG. 15, in an exemplary embodiment, a perspective diagram illustrates the optical module 10 with an optical connector 66 disposed therein. Of note, the bail 26, based on its design and the rotation about the connection 28, is configured to rotate over the optical connector 66. In this manner, the optical module 10 can be unlatched and removed from a host device (not shown) with the optical connector 66 connected thereto.

Figure 16:
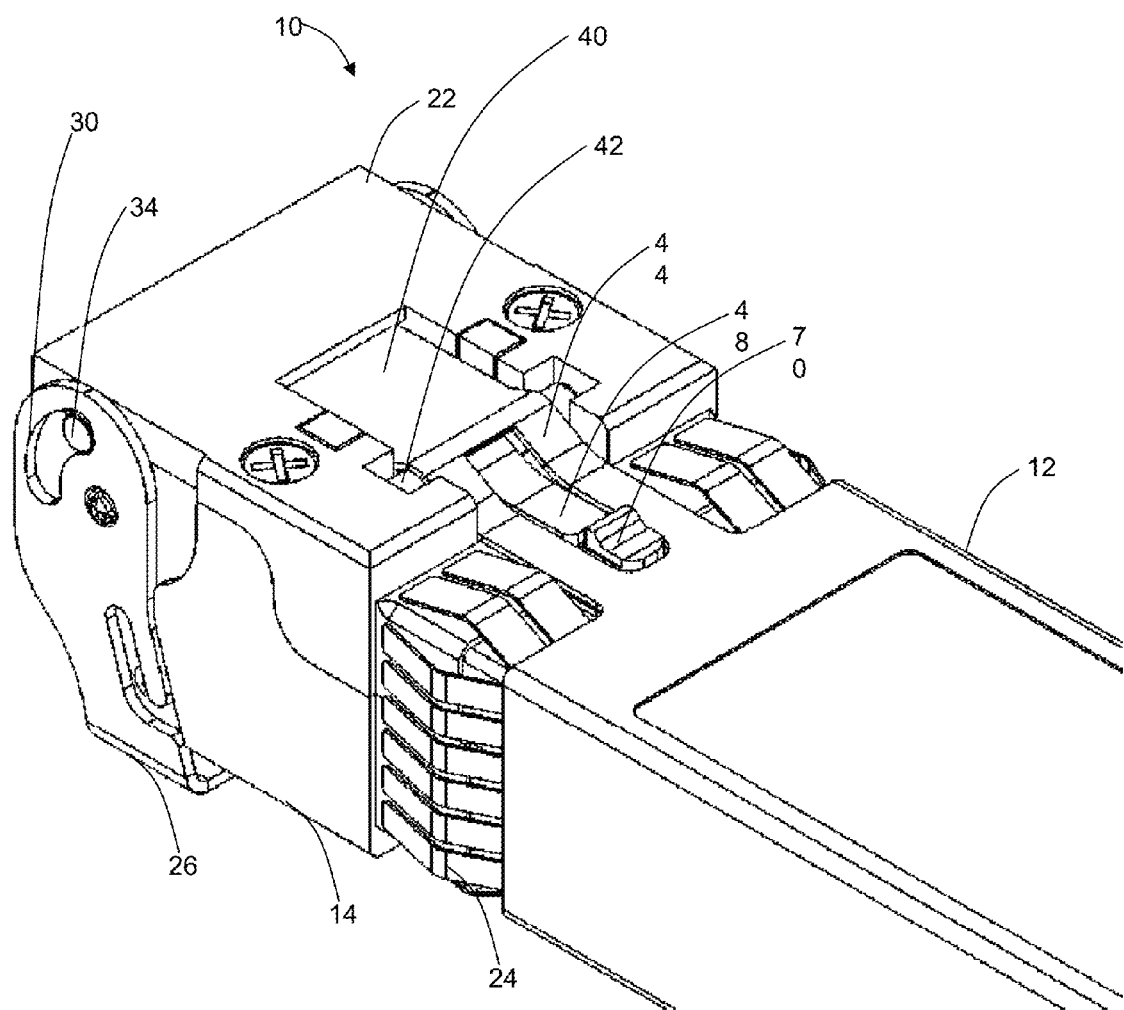
FIG. 16 is a perspective diagram of a bottom portion the optical module of FIG. 1 in an engaged position.
Figure 17:
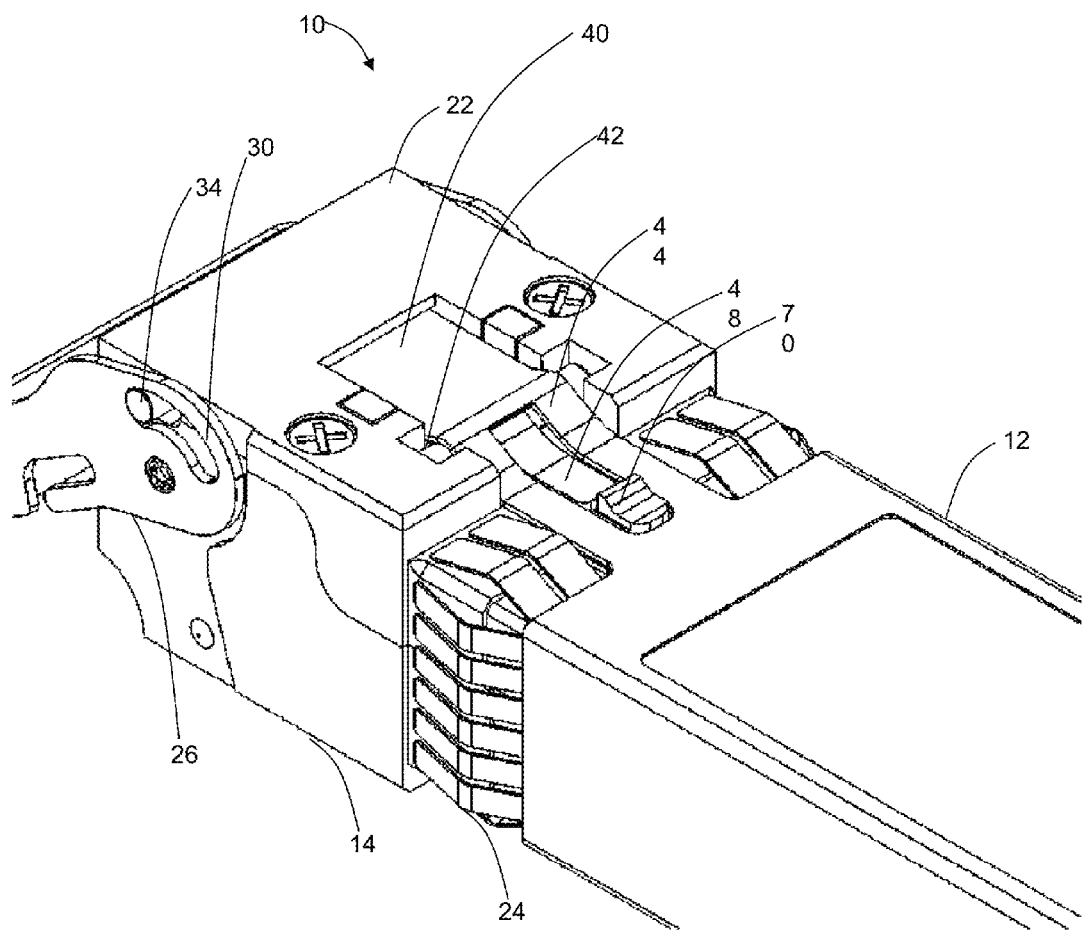
FIG. 17 is a perspective diagram of a bottom portion the optical module of FIG. 1 showing movement of the bail from FIG. 16.
Figure 18:
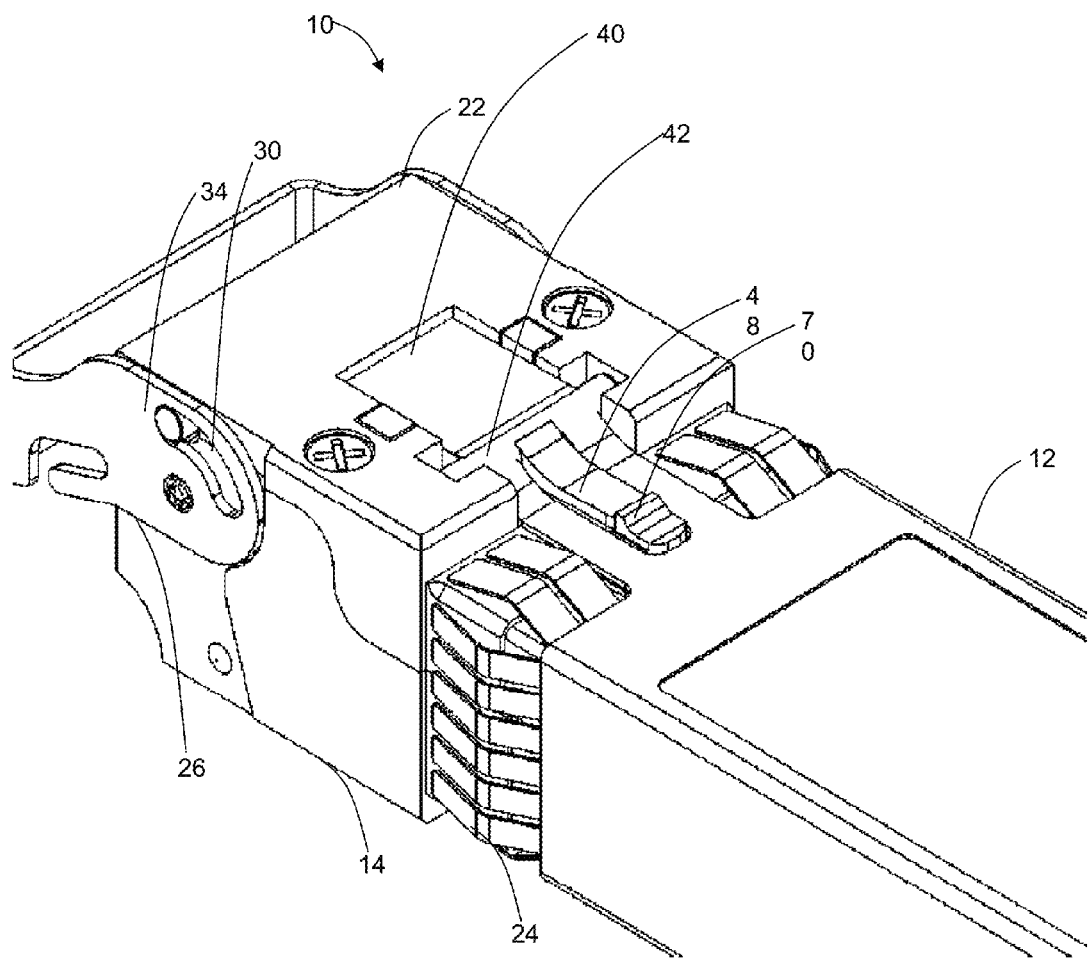
FIG. 18 is a perspective diagram of a bottom portion the optical module of FIG. 1 in a disengaged position from FIG. 17.

Referring to FIGS. 16-18, in exemplary embodiments, perspective diagrams illustrate a bottom portion the optical module 10 in a series of positions showing movement of the bail 26 from an engaged position to a disengaged position of the optical module 10. Specifically, FIGS. 16-18 illustrate disengagement of the optical module through the various mechanisms described herein. FIGS. 16-18 illustrate the bottom of the optical module 10 to show engagement/disengagement of the various components. FIG. 16 illustrates the optical module 10 with the bail 26 engaged. Here, the optical module 10 is disposed and connected in a cage, such as in a switch/router, etc.

A post 70 is attached to the lid portion 22 and catches a latch on the cage to hold the optical module 10 in the cage. To release the optical module 10 from the cage, the post 70 must be disengaged from the cutout in the cage which is performed by the slider 40 in conjunction with the bail 26. In FIG. 16, the optical module 10 is engaged in the cage, so the post 70 is disposed to the latch on the cage. Here, the cylinder 34 is in the engaged position in the first cutout 30 with the bail 26 positions over the front portion 14. In FIG. 17, the bail 26 is rotated such that the cylinder 34 is now at an end of the first cutout 30 such that any further rotation of the bail 26 will translate a force to the cylinder 34 to the slider 40.

In FIG. 18, the bail 26 pushes on the cylinder 34 causing force on the slider 40 which causes the cylinder 42 to ride up the ramp and deflect a sheet metal lead spring. The combined motion of the cylinders 34, 42 cause the lifter 48 to be raised at an angle. The lifter 48 makes contact with the cage lifting the latch such that the post 70 is disengaged from the latch.

Figure 19:
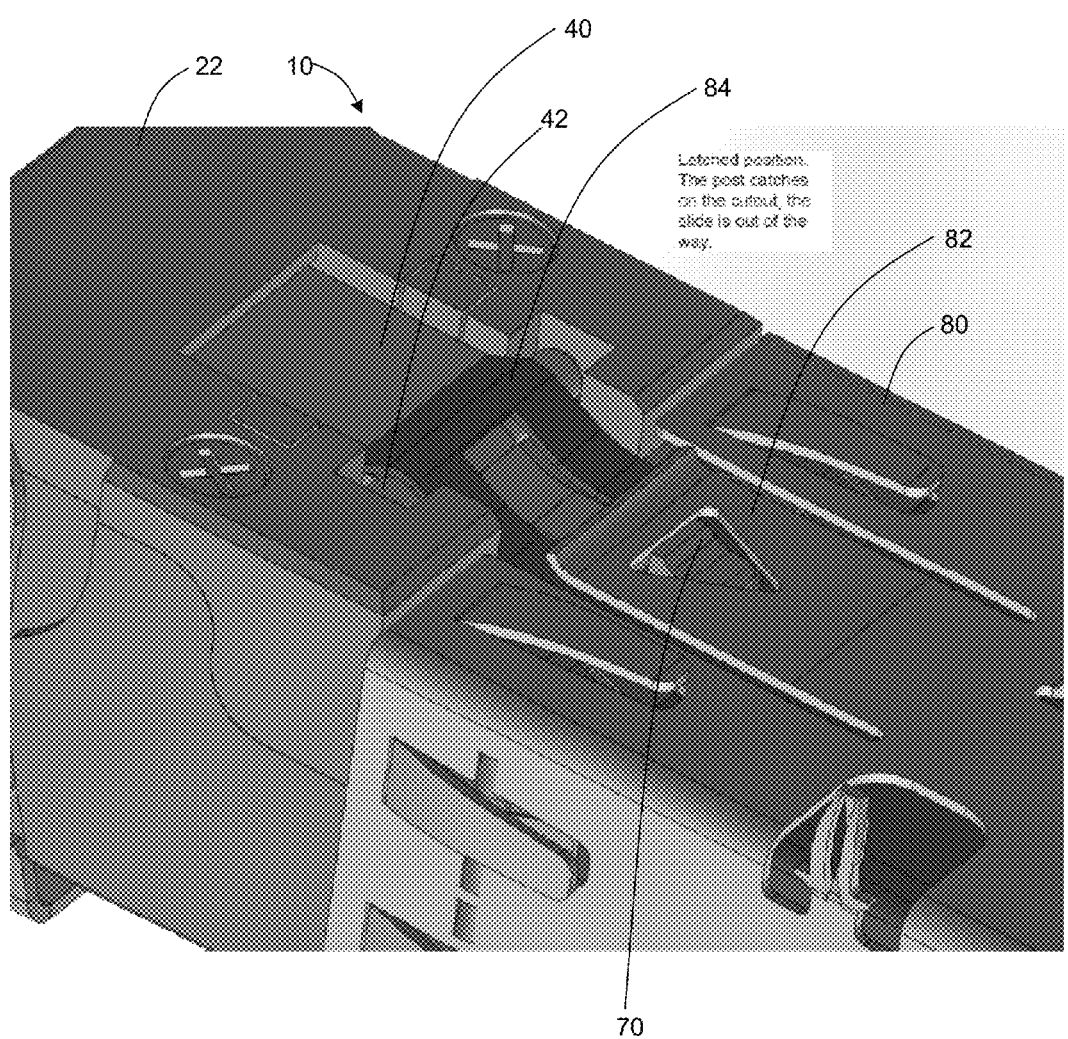
FIG. 19 is a perspective diagram of a lifter of the optical module of FIG. 1 engaged to a cage.
Figure 20:
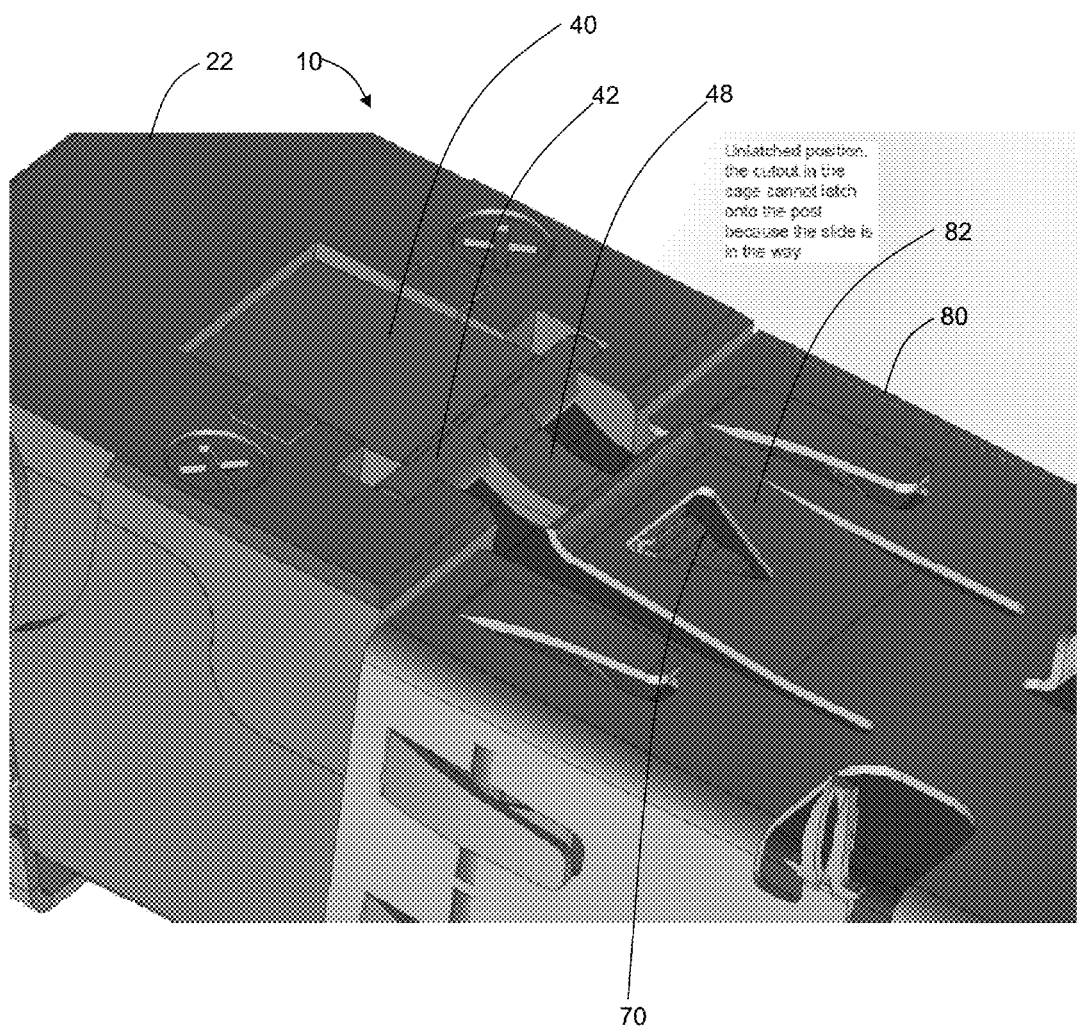
FIG. 20 is a perspective diagram of the lifter of the optical module of FIG. 1 disengaged from the cage.

Referring to FIGS. 19-20, in exemplary embodiments, perspective diagrams illustrate the lifter 70 of the optical module 10 engaged (FIG. 19) and disengaged (FIG. 20) from a cage 80. The cage 80 include a latch 82 for engaging the post 70. FIG. 19 also includes a sheet metal lead spring 84 over the cylinder 42, and the sheet metal lead spring 84 is omitted from FIG. 20 to illustrate action of the cylinder 42. In FIG. 20, the lifter 48 is shown engaging the latch 82 to lift the latch 82 over the post 70 thereby enabling disengagement by the optical module 10.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A latch assembly for a pluggable optical module, the latch assembly comprising:
   a slide disposed in the pluggable optical module, wherein the slide comprises a front cylinder connected to a rear cylinder with a slide body and a post connected to the rear cylinder;
   a bail over a top of a front portion of the pluggable optical module and rotatably connected thereto, wherein the bail comprises a first cutout portion on each side in which the front cylinder is moveably positioned therein;
   a closed portion for sliding the rear cylinder thereon and a second cutout portion on each side of the bail for snapping the bail in a latched position via a dimple disposed on each side of the front portion; and
   a lid portion disposed to the front portion, wherein the lid portion houses the slide enabling rotation of the front cylinder and the rear cylinder and sliding of the slide body,
   wherein the front cylinder is disposed within the pluggable optical module for translating force from the post thereto responsive to the bail moving the front cylinder, the front cylinder applying force to the rear cylinder via the slide body, and the rear cylinder translating the force to the post.

2. The latch assembly of claim 1, wherein a curvature of the first cutout portion defines movement of the bail.

3. The latch assembly of claim 2, wherein the bail comprises a top side, a left side, and a right side, and wherein the movement of the bail enables the bail to move over connectors connected to the optical connectors.

4. The latch assembly of claim 1, wherein the pluggable optical module comprises a Small Form Factor Pluggable (SFP).

5. The latch assembly of claim 1, wherein the pluggable optical module comprises an enhanced Small Form Factor Pluggable (SFP+).

6. The latch assembly of claim 1, wherein the pluggable optical module comprises a 10 Gigabit Small Form Factor Pluggable (XFP).

7. A method for a latch assembly for a pluggable optical module, the latch assembly comprising:
   providing a slide disposed in the pluggable optical module, wherein the slide comprises a front cylinder connected to a rear cylinder with a slide body and a post connected to the rear cylinder;
   providing a bail over a top of a front portion of the pluggable optical module and rotatably connected thereto, wherein the bail comprises a first cutout portion on each side in which the front cylinder is moveably positioned therein;
   providing a closed portion for sliding the rear cylinder thereon and a second cutout portion on each side of the bail for snapping the bail in a latched position via a dimple disposed on each side of the front portion; and
   providing a lid portion disposed to the front portion, wherein the lid portion houses the slide enabling rotation of the front cylinder and the rear cylinder and sliding of the slide body,
   wherein the front cylinder is disposed within the pluggable optical module for translating force from the post thereto responsive to the bail moving the front cylinder, the front cylinder applying force to the rear cylinder via the slide body, and the rear cylinder translating the force to the post.

8. The method of claim 7, wherein a curvature of the first cutout portion defines movement of the bail.

9. The method of claim 8, wherein the bail comprises a top side, a left side, and a right side, and wherein the movement of the bail enables the bail to move over connectors connected to the optical connectors.

10. The method of claim 7, wherein the pluggable optical module comprises a Small Form Factor Pluggable (SFP).

11. The method of claim 7, wherein the pluggable optical module comprises an enhanced Small Form Factor Pluggable (SFP+).

12. The method of claim 7, wherein the pluggable optical module comprises a 10 Gigabit Small Form Factor Pluggable (XFP).

* * * * *